United States Patent [19]

Nakazawa et al.

[11] Patent Number: 4,471,347

[45] Date of Patent: Sep. 11, 1984

[54] DISPLAY DRIVING CIRCUIT

[75] Inventors: Nobuo Nakazawa, Kashihara; Kenji Sano, Nara; Seiji Kimura, Yamatokoriyama, all of Japan

[73] Assignee: Sharp Kabushiki Kaisha, Osaka, Japan

[21] Appl. No.: 329,929

[22] Filed: Dec. 11, 1981

[30] Foreign Application Priority Data

Dec. 11, 1980 [JP] Japan ................. 55-175468

[51] Int. Cl.³ ............................................. G09G 3/00
[52] U.S. Cl. .................................. 340/719; 340/811; 340/752; 340/715
[58] Field of Search ............... 340/718, 719, 811, 752, 340/715, 784, 781

[56] References Cited

U.S. PATENT DOCUMENTS 3,564,135  2/1971  Weimer ........................... 340/719
4,070,600  1/1978  Butler et al. .................... 340/811
4,110,662  8/1978  Greeneich et al. ............... 340/719
4,300,138 11/1981  Nakauchi et al. ................ 340/811

Primary Examiner—Marshall M. Curtis
Attorney, Agent, or Firm—Birch, Stewart, Kolasch & Birch

[57] ABSTRACT

A circuit for driving a display comprises a condenser element for maintaining a voltage, the number of condenser elements corresponding to the number of picture elements of the display, a first switch for applying a voltage to the condenser element, a second switch for driving each of the picture elements according to the voltage maintained by the condenser element, and a third switch for testing said circuit by monitoring the voltage developed across said condenser element.

9 Claims, 2 Drawing Figures

DISPLAY DRIVING CIRCUIT

BACKGROUND OF THE INVENTION

The present invention relates to a driving circuit and, more particularly, to a circuit for driving any type of display, the circuit being formed within a semiconductor substrate.

Conventional display circuits comprise a plurality of switching elements which are aligned vertically and horizontally in a matrix arrangement. The conventional switching elements are formed within a semiconductor substrate using a large scale integration (LSI) technique. When the semiconductor substrate including the switching elements has defects, the switching elements can not provide accurate driving of a display. Therefore, before the product of the semiconductor substrate is completed, the semiconductor substrate forming the switching elements should be tested and, as a result, selected.

However, the conventional semiconductor substrate can not be tested and selected in the stage of wafer processing since conventional switching elements are not provided for this test and selection purpose.

SUMMARY OF THE INVENTION

Accordingly, it is an object of the present invention to provide an improved circuit for driving any type of display, the circuit being formed within a semiconductor substrate.

It is another object of the present invention to provide an improved circuit for driving any type of display, the circuit being formed within a semiconductor substrate so that the circuit is capable of being tested and selected while the semiconductor substrate is still in its raw wafer form.

Briefly described, in accordance with the present invention, a circuit for driving each display picture element comprises condenser means for maintaining a voltage, the number of the condenser means corresponding to the number of picture elements of the display, first switching means for applying the voltage to the condenser means, second switching means for driving each of the picture elements according to the voltage maintained by the condenser means, and third switching means for providing an operating voltage for the second switching means.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

A driving circuit of the present invention can drive any type of display including a fluorescent display tube, an electroluminescent display, a light emitting diode (LED) display, a liquid crystal display, or the like. For convenience, the display to be driven by the driving circuit is assumed to be a fluorescent display tube.

Figure 1:
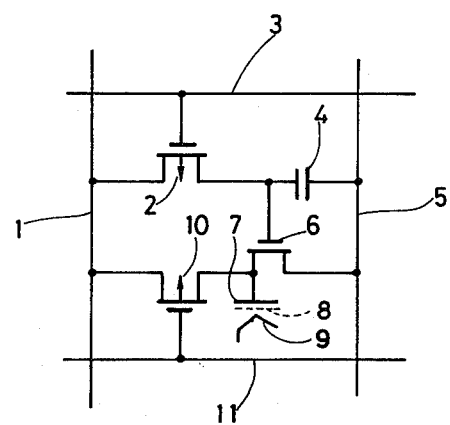
FIG. 1 shows an equivalent circuit of a switching element of the present invention for driving a single picture element.

FIG. 1 shows an equivalent circuit of a switching element for driving a single picture element according to the present invention. The switching element comprises a MOS field effect transistor (FET) 2, a condenser 4, another MOS FET 6, and a further MOS FET 10. Four lines 1, 3, 5 and 11 are thereby connected. The line 5 functions to hold an appropriate voltage level.

Scanning signals carried on the line 3 make the MOS transistor 2 conductive so that a voltage on the line 1 carrying visual signals is received and kept by the condenser 4. The voltage kept by the condenser 4 functions as a gate voltage to the driving FET 6 to define a voltage on a drain electrode 7.

The fluorescent display tube element is coupled to the drain electrode 7. A fluorescent substance is coated on a plate of the fluorescent display tube element. Electrons emit from a cathode 9. A grid 8 is provided for accelerating the electrons. They collide with the fluorescent substance on the plate, having energy dependent on the voltage of the fluorescent substance so as to fluoresce.

According to the present invention, the testing MOS FET 10 is connected between the driving MOS FET 6 and the line 1 carrying the visual signals. The gate electrode of the testing MOS FET 10 is coupled to the line 11 carrying testing signals. The level of the testing signals on the line 11 controls read out of the voltage of the drain electrode 7 of the driving MOS FET 6 and to place the read out voltage upon the line 1.

That is, the condenser 4 receives the voltage from the visual-signal line 1 with the conduction of the MOS FET 2 by the scanning signals on the line 3. The voltage held by the condenser 4 is read out into the visual-signal line 1 by the MOS FET 10 which is driven by the MOS FET 6 and the testing-signal line 11. Since the scanning signals on the line 3 and the testing signals on the line 11 appear on a different time, the MOS FETs 2 and 10 are not made conductive at the same time. The visual signals on the line 1 function as input/output signals.

When an appropriate number of the switching element of FIG. 1 are aligned vertically and horizontally to form a matrix, vertical and horizontal scanning signals are applied. Any selected MOS FETs 2, 6 or 10 may be made conductive so that a voltage corresponding to the visual signals is applied between the fluorescent substance and the cathode within the fluorescent display tube element. Simultaneously, the visual signal voltage is kept by the condenser 4 whereby, even when the display element is not selected, the voltage across the fluorescent substance and the cathode is maintained so as to prevent flickering and provide stable display.

Figure 2:
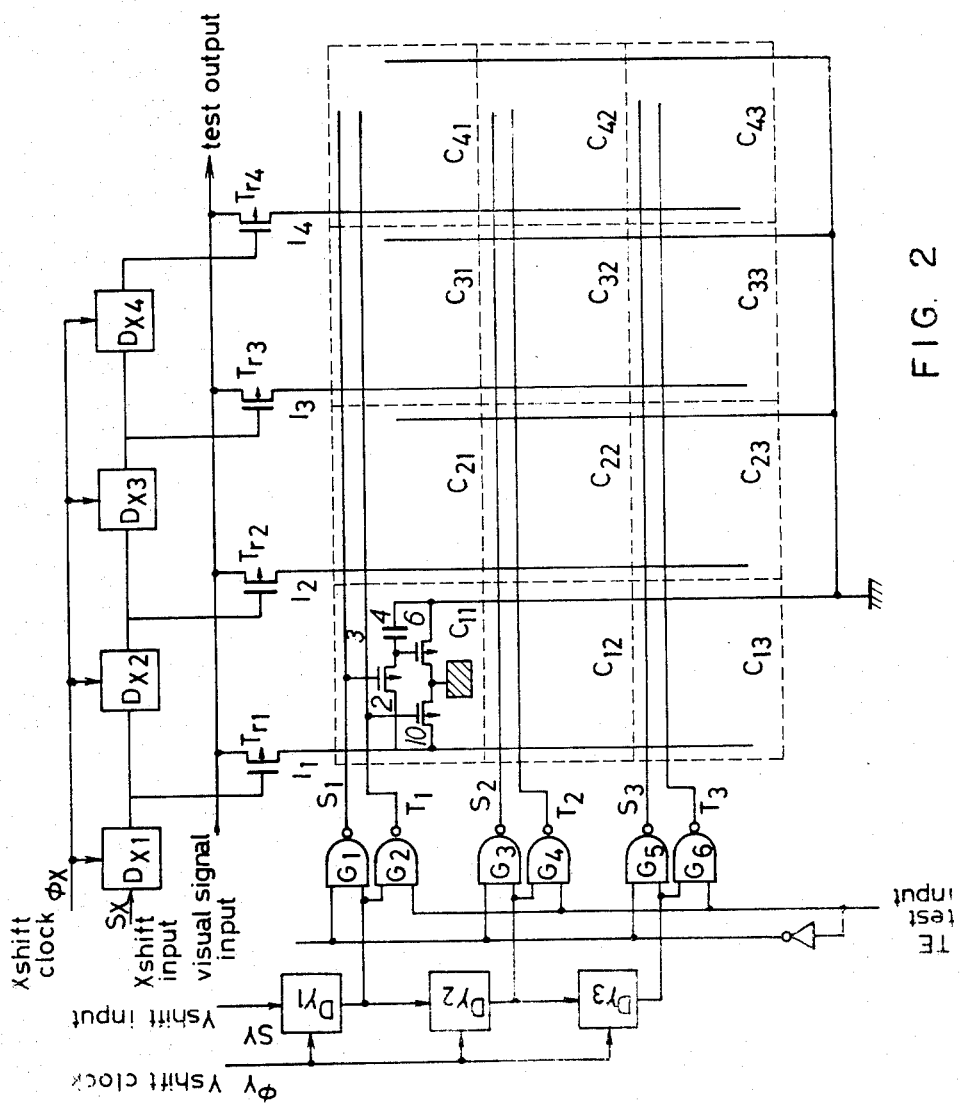
FIG. 2 shows a circuit configuration of a driving circuit of the present invention for driving a full-display panel in which a plurality of switching elements of FIG. 1 are aligned vertically and horizontally in a matrix arrangement.

FIG. 2 shows a circuit configuration of an example of such a matrix-type circuit comprising four switching elements such as $C_{11}$ to $C_{41}$ vertically (X axis) and three switching elements such as $C_{11}$ to $D_{13}$ horizontally (Y axis). The elements except for $C_{11}$ are not illustrated for convenience.

An X shift register comprises four delay flip-flops $D_{x1}$ to $D_{x4}$. A Y shift register comprises three delay flip-flops $D_{y1}$ to $D_{y3}$. These registers select each of the switching elements. Y shift input signals $S_y$ and Y shift clock signals $\phi_y$ are applied to each of the delay flip-flops $D_{y1}$ to $D_{y3}$ to sequentially shift the flip-flops. When test input signals $T_E$ are placed in a logic "0", NAND gates $G_1$, $G_3$ and $G_5$ cause scanning lines $S_1$, $S_2$ and $S_3$ to be sequentially selected. When the test input signals $T_E$ are placed in a logic "1", other NAND gates $G_2$, $G_4$ and $G_6$ cause testing signal lines $T_1$, $T_2$ and $T_3$ to be sequentially selected.

When the scanning line $S_1$ is selected, the condensers 4 of the elements $C_{11}$, $C_{21}$, $C_{31}$, and $C_{41}$ receive the voltage. While the scanning line $S_1$ is selected, X shift input signals $S_x$ and X shift clock signals $\phi_x$ are applied to each of the delay flip-flops $D_{x1}$ to $D_{x4}$ to sequentially shift the flip-flops. Four MOS FETs $T_{r1}$ to $T_{r4}$ are sequentially selected so that the visual signal input is sequentially applied to and written in the condensers 4 of the elements $C_{11}$, $C_{21}$, $C_{31}$, and $C_{41}$.

When the test input signals $T_E$ are placed in the logic "1" so as to select the testing signal line $T_1$, the voltages maintained by the condensers 4 of the elements $C_{11}$, $C_{21}$, $C_{31}$, and $C_{41}$ are sequentially read out on the visual signal lines $1_1$ to $1_4$ through the MOS FETs $T_{r1}$ to $T_{r4}$.

Similar operations are held on the scanning lines $S_2$ and $S_3$, and the testing signal lines $T_2$ and $T_3$.

The type of the switching transistors above described is a P-channel MOS FET. However, an N-channel MOS FET, a bipolar transistor, or any type of switching element can also be used in the present invention. The above switching elements are contained in a silicon chip and any other kind of chip. One or more chips each containing the switching elements can be employed for a single display unit.

Since the present display driver circuit is arranged as described above, the driver circuit can be tested even when the semiconductor substrate is its wafer state. The switching elements showing good circuit operations are then selected to form a final display driving circuit.

The invention being thus described, it will be obvious that the same may be varied in many ways. Such variations are not to be regarded as a departure from the spirit and scope of the invention, and all such modifications are intended to be included within the scope of the following claims.

We claim:

1. A matrix display system comprising:
a matrix having a plurality of display elements; and
drive means operatively connected with said matrix display for supplying video information to said display;
means for scanning said display elements;
said matrix display having interface means integrally formed therewith for receiving said video information and applying said video information to each said display element responsive to said scanning means, said interface means further including,
testing means for reading said video information previously received by said interface means for determining whether said interface means is fully functional prior to assembly of said interface means into said matrix display.

2. A matrix display system comprising:
a matrix display having a plurality of display elements arranged in rows and columns and addressable with orthogonal video information application lines and scanning lines;
drive means for applying video information on said video information application lines in the form of a video information signal and sequentially scanning said display elements along each scanning line by application of a scanning signal thereto; and
interface means integral with said matrix display and responsive to said video information signal and said scanning signal for applying a corresponding display element portion of said video information to each respective said display element, said interface means further including ;
testing means for reading each said corresponding display element portion of said video information applied to each said display element for determining whether each said interface circuit means is fully functional prior to assembly of said interface means into said matrix display.

3. The system of claim 2 wherein said interface circuit means includes an interface circuit means associated with each display element and including display portion storage means for retaining said corresponding display element portion of said video signal therein;
said testing means sequentially reading the contents of each said display portion storage means to develop a reproduced video signal for determining the operability of each interface circuit means.

4. The system of claim 3 wherein each interface circuit means further includes:
first switching means for applying said video information on said video information application line to said display portion storage means to store a display element voltage therein in response to receipt of a scanning signal on a said scanning line; and
a second switching means for applying a display element signal related to said display element voltage to the corresponding said display element.

5. The system of claim 4 wherein said testing means comprises:
third switching means for applying said display element signal to a said video signal application line during testing in response to receipt of a test signal sequentially applied to a plurality of test lines orthogonally arranged with respect to said video information application lines;
means for generating said test signal when in a test mode; and
means for inhibiting application of video information by said drive means during testing.

6. The system of claim 5 wherein each said display element has an electrode formed on a first substrate;
said first substrate further supporting said interface means, said third switching means and said video information application lines, scanning lines and test lines.

7. The system of claim 6 wherein said first substrate and other elements formed thereon may be tested by said testing means prior to assembly of said matrix display.

8. A method of constructing and testing a matrix display panel having interface means for receiving information applied to said matrix display and for applying said matrix display and for applying said information to each display element of said matrix display, said interface means being formed on a substrate thereof in conjunction with an electrode of each display element, said method comprising:
forming means on said substrate suitable for reading the voltage applied to each said display element by said interface means;
using said means for reading to test said substrate and the operability of said interface means; and
forming said matrix display panel from said tested substrate.

9. The method of claim 8 wherein said substrate is in wafer form; and
wherein said step of forming includes finishing said substrate subsequently to testing said substrate in wafer form.

* * * * *